C. K. DODGE.
LOCOMOTIVE WATERING DEVICE.
No. 179,473.  Patented July 4, 1876.
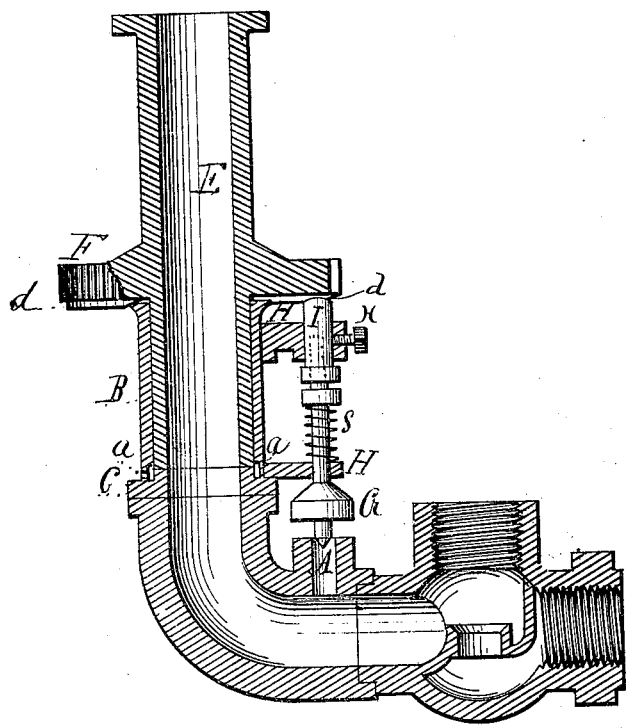
WITNESSES:
Shepherd H. Wheeler
Leonidas Holmes
INVENTOR
Caleb K. Dodge

UNITED STATES PATENT OFFICE.

JOSEPH PEARSON GILL, OF NEWARK, NEW JERSEY.

IMPROVEMENT IN THE MANUFACTURE OF GAS FOR ILLUMINATING AND HEATING.

Specification forming part of Letters Patent No. 179,474, dated July 4, 1876; application filed June 6, 1876.

*To all whom it may concern:*

Be it known that I, JOSEPH PEARSON GILL, of the city of Newark, in the county of Essex and State of New Jersey, have invented certain new and useful Improvements in the Manufacture of Gas for Illuminating and Heating Purposes; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in improvements in the method of manufacturing hydrogen gas; in the combination of hydrogen gas, superheated steam, and petroleum and its distillates, and other solid and liquid hydrocarbons; and in the means employed in manufacturing and in operating the same, of which the following is a description illustrated by the accompanying drawings.

In the manufacture of hydrogen gas I use several kinds of retorts, either of which may be employed, as circumstances may require, that the process may be applied to gas-works already in operation, as well as to new works. Said retorts may be horizontal or inclined, and may be filled, in whole or in part, with links, or pieces, or scraps of iron, or with any other metallic or semi-metallic substances; or with any mineral or carbonaceous materials, which are heated to any required temperature for the decomposition of the steam.

Steam is made in a boiler, B, and superheated in superheaters S, and in superheaters S'; or the steam may be superheated in any other form of superheater in use. I preferably use in a bench of horizontal or inclined retorts horizontal or inclined superheaters S S', as in Plate 1, filled with iron scrap or other metallic or mineral substances in an incandescent state, through which steam is conducted in a downward direction, and discharged downward from the bottom of the superheaters S', or their mouth-pieces, and thence, by the pipes A, downward into the hydrogen-retorts H at points $a$, in which it is decomposed into hydrogen and carbonic-oxide gases. Crude petroleum, or any hydrocarbon liquid or distillate, is vaporized, and commingled with superheated steam or hydrogen gas in the vaporizer E F, the liquid or distillate entering simultaneously with the superheated steam or hydrogen at E, and discharged, by an outlet-pipe, G, from F, connecting with pipes A at the points $b$, and thence with the hydrogen-retorts H, into which the commingled vapors enter and are delivered into the inner part thereof. To more effectually decompose these vapors into hydrogen gas they are passed, in a downward direction, through the incandescent contents of the hydrogen-retorts, and are withdrawn downward through an outlet at the bottom of the retorts, thus reversing the ordinary method of manufacture, in which the vapors pass upward in the retorts, and the gas and vapors are withdrawn by an outlet on the upper side thereof, my improvement in the process and apparatus at this point consisting in changing the method of manufacture from an upward to a downward current by means of the apparatus employed, and by which I am able to obtain the use of the entire capacity of the retort for the purpose of decomposing the vapors, and insuring their complete conversion into fixed gas, neither of which can be accomplished when the outlet is made at the upper side of the retort. From the hydrogen-retorts H the hydrogen and carbonic-oxide gases pass outward and downward from the bottom side of the retorts, or their mouth-pieces, through the pipes P into and through a vaporizer, M N, entering M, and the hydrocarbon fluid entering from the pipe $v'$ at the point $m$. The gases and hydrocarbon-fluid commingle in the vaporizer, forming a very elastic vapor, which is thence conveyed, through an outlet in N, to fluid hydrocarbon-gas retorts I at the point K, for conversion into illuminating-gas, which passes through the stand-pipes W into the usual hydraulic main, where it may be combined with coal gas made in other retorts, substantially in the manner as described and set forth in the specification, drawings, and claims in U. S. Letters Patent No. 171,117, issued to me December 14, 1875. Any form of retort may be used—such, for instance, as those in Figs $A^1$ $A^2$ $A^3$ $A^4$, Sheet 4, of Patent No. 171,117, and described therein.

Referring to the annexed drawing, Figure 1 represents a vertical view of the apparatus,